United States Patent [19]

Chernega

[11] Patent Number: 4,595,640
[45] Date of Patent: Jun. 17, 1986

[54] LUBRICANT SYSTEM FOR MAGNETIC RECORDING MEDIA CONTAINING ISOMERIC ACIDS OR ALCOHOLS

[75] Inventor: John G. Chernega, St. Paul, Minn.

[73] Assignee: Minnesota Mining and Manufacturing Company, St. Paul, Minn.

[21] Appl. No.: 565,415

[22] Filed: Dec. 27, 1983

[51] Int. Cl.$^4$ ................................................ G11B 5/72
[52] U.S. Cl. ................................ 428/695; 252/62.54; 360/134; 360/135; 360/136; 427/128; 427/131; 427/132; 428/900
[58] Field of Search .............. 428/695, 694, 900, 693; 427/132, 131, 128; 360/134–136; 252/62.54

[56] References Cited

U.S. PATENT DOCUMENTS

| | | | |
|---|---|---|---|
| 3,704,152 | 11/1972 | Hartman | 252/62.54 |
| 3,865,627 | 2/1975 | Roden et al. | 117/240 |
| 4,172,176 | 10/1979 | Tanaka | 428/695 |
| 4,223,361 | 9/1980 | Zaitsu et al. | 360/113 |
| 4,247,407 | 1/1981 | Naruse | 428/695 |
| 4,383,000 | 5/1983 | Fujika | 428/695 |
| 4,383,001 | 5/1983 | Fujika | 428/695 |
| 4,395,466 | 7/1983 | Ogawa | 252/62.54 |
| 4,420,540 | 12/1983 | Ogawa | 428/695 |
| 4,465,737 | 8/1984 | Miyatuka et al. | 428/339 |

FOREIGN PATENT DOCUMENTS 0038730 10/1981 European Pat. Off. .

OTHER PUBLICATIONS van Oss, Dr. J. F., "Chemical Technology: An Encyclopedic Treatment", vol. III p. 571, 1970.
Tabor, D., "Friction, Adhesion and Boundary Lubrication of Polymers" in *Advances in Polymer Friction and Wear, Polymer Science and Technology*, vol. 5A, 1974.

*Primary Examiner*—Ellis P. Robinson
*Attorney, Agent, or Firm*—D. M. Sell; J. A. Smith; D. B. Little

[57] ABSTRACT

An improved lubricant system for magnetic recording media such as helical scan video tapes is disclosed. The resulting improved magnetic recording media comprise the usual flexible or rigid backing and a magnetizable layer on the backing, but the lubricant is comprised of an organic compound selected from the group consisting of isomeric carboxylic acids and isomeric alcohols (e.g. iso-stearic acid and iso-stearyl alcohol). A fatty acid ester may be included in the lubricant.

A typical composition utilizes 0.5 parts by weight iso-stearic acid per 100 parts of magnetizable material (e.g., cobalt doped ferric oxide particles) and 1 part by weight of isopropyl palmitate per 100 parts of the magnetizable material. Video tapes lubricated with this new system, have shown improved electromagnetic output (e.g., higher signal-to-noise ratios). In addition, they are able to withstand the stop motion of a helical scan video head better than prior known lubricant systems.

13 Claims, No Drawings

LUBRICANT SYSTEM FOR MAGNETIC RECORDING MEDIA CONTAINING ISOMERIC ACIDS OR ALCOHOLS

TECHNICAL FIELD

This invention concerns the lubrication of magnetic recording media such as tapes and flexible or rigid disks.

BACKGROUND

Magnetic recording media are basically heterogeneous structures comprised of both organic (polymeric) and metallic or ceramic materials. Under use, temperature variations of 40° C. and humidity variations of 90% are not uncommon, yet the media must perform well regardless of the environment. In the case of video tape, the tape experiences both relative speeds of a few centimeters per second in tape transport and relative speeds of several hundred centimeters per second in video head velocity, yet the tape must be protected against wear at both speeds.

Lubricants are included in or coated on the magnetizable layer of the recording medium to protect against wear, and the demands placed on the lubricant are considerable. Known lubricants include silicones, liquid paraffins, straight chain fatty acids such as myristic acid, palmitic acid and stearic acid and fatty acid esters. With increasing amounts of fatty acid and liquid paraffin lubricants, the durability of the medium improves. However, amounts of lubricant which are too great can soften the coating, reducing its durability, and this may cause clogging of the recording or playback heads.

Still-framing in video recorders adds the problem of frictional heat which can damage the binder. In helical scan video recorders, tape motion is stopped, and the rotating heads scan a particular portion of the recorded material which is displayed on a television screen. The temperature generated in the contact area between the rapidly moving head and the tape can be in the order of several hundred degrees centigrade, and this may cause undue tape wear or the collection of debris on the head. Debris, as used here, means oxide or binder build-up on magnetic heads and tape guides. A stop motion test is used in the evaluation of video tapes.

There is a recognized need for a better lubricant system for helical scan video tapes. Current commercial systems are subject to variation both with respect to durability and stop motion. In addition, a decrease in signal-to-noise output (S/N) at low humidities is a continuing problem and must be improved.

Because disc drives are now being placed in factory, home, and other less protected and unconventional environments, media may face temperature extremes beyond the limits of old lubricant specifications. New lubricants are desired which are effective at low temperatures (e.g. about 5° C.) where some prior art lubricants lose their effectiveness.

DISCLOSURE OF INVENTION

This invention provides a magnetic recording material comprising: a backing (which may be flexible or rigid); a magnetizable layer containing a magnetizable material on said backing; and a lubricant comprising an organic compound selected from the group consisting of isomers of carboxylic acids and isomers of alcohols said isomers having about 12 to 30 carbon atoms per molecule, used either alone or in conjunction with a fatty acid ester.

Generally, higher molecular weight species of the isomeric alcohols and acids are preferred. However, the very high molecular weight species (e.g. 40 or more carbon atoms per molecule) may suffer from incompatibility with the binder. Two particularly useful lubricants are iso-stearic acid and iso-stearyl alcohol.

The prefix "iso" as used in naming organic compounds herein denotes an isomer or mixture of isomers of the named compound. Each isomer has a subordinate chain of one or more carbon atoms attached to a carbon atom of the main straight chain.

The isomers used in this invention having from 12 to about 24 carbon atoms per molecule are liquids at room temperature. The liquid nature of these materials results from their molecular configuration which consists of a complex mixture of isomers having primarily methyl branching. These molecules are mutually soluble in one another and virtually inseparable. As a result, melting point, viscosity, specific gravity and other physical properties are different from the corresponding saturated straight chain acid and alcohol. For example, the viscosity of iso-stearic acid is about 50 centipoise at 25° C., and the viscosity of iso-stearyl alcohol is about 58 cps; whereas, both normal stearic acid and normal stearyl alcohol are solids at that temperature.

Preferably the lubricant also comprises a fatty acid ester usually having about 12 to 40 carbon atoms in its molecule. In general, the major carbon chain (usually the one derived from a fatty acid) is chosen to have about the same number of carbon atoms as the isomeric acid or alcohol. This helps ensure common physical and chemical properties of the mixture of fatty acid ester and the isomeric acid or alcohol (i.e., similar boiling point range and compatible molecular packing geometries).

The recording media having improved lubricant systems described above possess a number of advantages over media lubricated by systems in the prior art. They have greater durability at normal room conditions and in extreme environments (e.g. 40° C. at 80% relative humidity (RH)). They can withstand stop motion in a helical scan recorder for more than one hour. The variability of durability in stop motion parameters is reduced from lot to lot of the tapes produced with the improved lubricant system. S/N loss at dry conditions (10% RH) has been reduced over tapes lubricated with normal myristic acid, lauric acid and butyl myristate. Also, the radio frequency (Rf) decay is less with the new lubricant system. In general, electromagnetic output is improved.

The isomers of this invention which are liquids possess distinct handling advantages over the known fatty acid solid lubricants. They are soluble in common solvents, (isopropyl alcohol and heptane). Also, they do not require extra carrier solvent for use, thus, alleviating the problem of dispersion "thin down shock". Compared to their straight chain precursors, the isomeric analogs have a reduced tendency to plasticize or soften the binder. Being liquids, the possibility of bloom or "white-rub off" is eliminated. This has been a continuing, long-standing problem in the industry.

Another advantage of the isomeric acids and alcohols of this invention is that they have low iodine numbers (3.0 for iso-stearic acid vs. 89.9 for oleic acid) meaning that they have low unsaturation and thus are not subject to auto-oxidation (rancidity) or polymerization. Polymerization would cause formation of medium molecular weight oligomers which are semi-solid and tacky. These materials are incompatible with the binder matrix used in magnetic media and in time would exude from the coating possibly causing head clogging.

The term "magnetizable material" is used in this description to refer to the component of the total recording medium (tape or disc) which is the carrier of magnetic signals, i.e., the iron oxide; chromium dioxide, or fine metal (see U.S. Pat. No. 3,865,627) particles in a pigment/binder system or the metal or metal alloy of a thin metal film medium (e.g. evaporated metal coating). The term magnetizable layer refers to the layer of a recording medium which contains the magnetizable material (e.g., pigment/binder layer or thin metal film). The terms magnetic recording medium and recording medium are defined as the article (e.g., tape or disk) which comprises the magnetizable layer on a backing.

The inventive magnetic recording media can be made by conventional techniques, adding the new lubricant or substituting it for the one formerly used. In the case of pigment dispersion type media, the dispersion is made by milling the ingredients of the magnetizable layer (e.g., polyurethane binder, gamma ferric oxide pigment, wetting agent, solvent and lubricant) for a sufficient time to obtain a uniform dispersion. The dispersion is then applied in a coating process, such as gravure or knife coating, to a flexible backing (e.g., polyester film). After coating, the coated material undergoes orientation in a magnetic field to align the pigment particles. After that step, the recording medium is dried.

Although described herein with regard to pigment/binder type media, the inventive lubricant system can also benefit other types, such as thin metal film and metal particle media.

DETAILED DESCRIPTION

The concentration of isomeric alcohol or isomeric acid in the magnetic recording medium is preferably about 0.2–2 weight percent of the magnetizable material (e.g., pigment particles) for tape, and about 5 or less weight percent of the magnetizable material for disks. The lubricant may be either added to a pigment dispersion as an "internal lubricant" or applied as a coating solution in a solvent such as heptane or isopropanol over the magnetizable layer. Typical pigment or magnetizable materials useful in this system are: magnetite, chromium dioxide, and gamma ferric oxide. The magnetite or gamma ferric oxide may be cobalt doped or cobalt-adsorbed.

The fatty acid ester used in conjunction with the iso-stearyl alcohol or iso-stearic acid may be selected from isopropyl palmitate, butoxy ethyl stearate, butyl stearate, iso-stearyl iso-stearate and isopropyl stearate (available from Wicken Products, Inc., Huguenot, N.Y., as Wickenol 127). The fatty acid ester is normally present in an amount of less than or equal to five weight percent of the magnetizable material and should be present in an amount ranging between about 0.2 and 2 weight percent of the magnetizable material for video applications.

This invention will be further clarified by a consideration of the following examples, which are intended to be purely exemplary. Unless otherwise stated, the recording media tapes used for the examples were made as follows:

Three charges were made:

| Components | Parts By Weight |
| --- | --- |
| Charge 1 | |
| Toluene | 18 |
| Methyl ethyl Ketone | 18 |
| Cyclohexanone | 48 |
| Dispersing Agents | 6 |
| Copolymer of vinyl chloride, vinyl acetate and vinyl alcohol (obtained as VAGH from Union Carbide Corporation) | 5 |
| Acicular cobalt encapsulated $Fe_3O_4$ particles, average length about 0.2 micrometer, aspect ratio of about 6 to 1. | 100 |
| Organic binder material - (high molecular weight polyester-polyurethane polymer synthesized from neopentyl glycol and poly-epsilon-caprolactone diol) | 5 |
| Charge 2 | |
| Toluene | 18 |
| Methyl ethyl Ketone | 52 |
| Cyclohexanone | 18 |
| Organic binder material - same as Charge 1 | 10 |
| Head cleaning agent ($Al_2O_3$ particles, 0.3 micrometers average particle size) | 3.0 |
| Charge 3 | |
| Methyl ethyl Ketone | 12 |
| Toluene diisocyanate based adduct of trimethylol propane (obtained as Mondur CB-60 from Mobay Chemical Company) | 7.5 |
| Carrier solvent for the diisocyanate-ethylene glycol monobutyl ether acetate (obtained as Cellosolve acetate from Union Carbide Corporation) | 5 |
| Lubricant(s) | 1–2 |

Charges 1 and 2 were consecutively stirred in a blade mixer until homogeneous after which they were placed into a sand mill. This mixture was milled in the sand mill until a uniform dispersion was obtained containing no visible particle aggregates or agglomerates. Samples were removed about every two hours and spread manually on a substrate to test uniformity.

The uniform dispersion of Charges 1 and 2 was stirred in a blade mixer, and the homogeneous Charge 3 was slowly added. The resulting dispersion (about 42% solids) was immediately rotogravure coated onto biaxially oriented polyester film about 0.015 mm thick. After heating to drive off the volatile materials, the recording medium was calendered to provide a very smooth magnetizable layer surface.

The $Fe_3O_4$ particles comprised about 72.3 weight percent of the magnetizable layer, and the $Al_2O_3$ particles comprised about 2.2 percent. The thickness of the finished magnetizable layer, designed for helical scan video recording, was about 5.1 micrometers.

Several tests were used to judge the performance of the lubricated tape. Runnability is a pass/fail test on a commercially available video tape recorder in which two minutes of recorded information is replayed 200 times at controlled temperature and humidity conditions. In order to pass the test, the medium must lose no more than 6 decibels of its output signal amplitude. Radio frequency (Rf) decay is the measured loss of amplitude in decibels (dB) during the runnability test. Stop motion is another pass/fail test in which a sample of the recording medium is subjected to 60 minutes in the stop-motion or freeze frame mode of a helical scan video player. In order to pass the stop motion test, the medium must lose less than 6 decibels of its recorded radio frequency signal. Signal-to-noise ratio (S/N) of a test tape is video S/N when playing back a 4 to 5 mega-Hertz signal recorded on the tape. Signal-to-noise (S/N) loss is the measured loss in signal-to-noise ratio between standard room conditions (21° C. and 50% relative humidity) and 10% relative humidity. Generally, in the S/N loss and Rf decay tests, a difference of greater than ½ (dB) is considered significant.

Unless otherwise specified, weight percents given in the examples are expressed as percent by weight of the magnetizable material (e.g., ferric oxide particles) in the recording medium, and test data represents the average of results for testing two video tape cassettes.

EXAMPLE I

Representative media were made, the inventive lubricant Sample A being made of a dispersion containing 0.5 weight percent iso-stearic acid and 1.0 weight percent isopropyl palmitate (obtained from Wicken Products, Inc. as Wickenol 111). The control, Reference A, used a standard lubricant of butyl myristate and myristic and lauric acids. The media was slit to ½ inch width and loaded into video cassettes of the VHS format. The data from the above described tests, are indicated in Table 1 below.

TABLE 1

| Sample | Runnability* | Rf Decay | Stop Motion | S/N Loss |
|---|---|---|---|---|
| A | all passed | 2.7 dB | all passed | 4 dB |
| Reference A | all passed | 2.2 dB | all passed | 8 dB |

*at 40° C., 80% relative humidity

The same tests were run again on a more extensive sampling than was used for Table 1 and basically confirmed the results shown, with only about half the control samples able to pass the runnability and stop motion tests. A significant improvement in signal-to-noise ratio loss was observed with the new lubrication system.

EXAMPLE II

Tapes were also made in the Betamax format and were tested as described above. For the Betamax tests, the experimental dispersion (Sample B) contained 0.35% iso-stearic acid and 0.7% butoxyethylstearate (available from Stepan Chemical Company, Maywood, N.J.). The results of testing these media are indicated in Table 2 below.

TABLE 2

| Sample | Runnability** | Stop Motion | S/N* |
|---|---|---|---|
| B | all passed | all passed | 3.2 |
| Reference B | most passed | most passed | 0.0 |

**at 21° C. and 50% relative humidity
*S/N of Reference B subtracted from S/N value for sake of comparison.

From the two tables above, it can be seen that the use of iso-stearic acid results in an improvement in the electromagnetic output of a video tape.

EXAMPLE III

Wear tests have also been made for diskettes which were aged 90 days before testing. Each had a magnetizable layer comprising gamma $Fe_2O_3$, a binder of phenoxy and polyurethane polymers, conductive carbon and wetting agents, and each diskette was spun lubricated (i.e., lubricant wiped or sprayed onto spinning disk) with a three percent solution of lubricant. For each lubricant, ten diskettes were wear tested by rotating each one in its jacket with a magnetic recording head riding on a prerecorded test track near the periphery of the disk for a maximum of 48 hours. A dropout or failure was indicated when output level fell below 50% of initial output for that disk. Ten different drives were used, and the samples were moved so that each diskette was run on each drive, and a minimum of three samples of each lubricant were being tested at the same time. For the samples which were aged 90 days before being tested, the results were:

| Lubricant | Percent of Discs Passing Wear Test |
|---|---|
| iso-stearic acid | 90% |
| oleic acid | 60% |
| isopropyl palmitate | 30% |

Those which were treated with a coating of iso-stearic acid exhibited a 50% greater success rate in wear testing than diskettes lubricated with oleic acid.

As shown above, the magnetic recording media of this invention are well lubricated and can withstand the frictional heat of video tape player stop motion for long periods of time. The examples show that the inventive media have good signal to noise ratios, and the physical properties of the new lubricants make these media effective at low temperatures (e.g. 5° C.) where others are not effective. Therefore, the new media may be used with confidence in environments (e.g. factories) without the sophisticated temperature and humidity controls required for many present day electronic equipment installations.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A magnetic recording medium comprising: a backing; a magnetizable layer containing a magnetizable material on said backing; and a lubricant comprising both an organic compound selected from the group consisting of isomers of carboxylic acids having about 12 to 30 carbon atoms per molecule and a fatty acid ester having about 12 to 40 carbon atoms in its molecules.

2. The magnetic recording medium of claim 1 wherein the magnetizable material is selected from the group consisting of: chromium oxide, ferric oxide, magnetite, cobalt doped ferric oxide, cobalt absorbed ferric oxide, cobalt doped magnetite, cobalt adsorbed magnetic, fine metal particles and the metal or metal alloy of a thin metal film medium.

3. The magnetic recording medium of claim 1 wherein the organic compound is present in an amount of less than or equal to five weight percent of the magnetizable material.

4. The magnetic recording medium of claim 1 in which the major carbon chain of the fatty acid ester has about the same number of carbon atoms as the organic compound.

5. The magnetic recording medium of claim 1 wherein the fatty acid ester is present in an amount of about five or less weight percent of the magnetizable material.

6. A magnetic recording medium comprising: a backing; a magnetizable layer containing a magnetizable material on said backing; and a lubricant which comprises both an organic compound selected from the group consisting of iso-stearic acid and iso-stearyl alcohol and a fatty acid ester selected from the group consisting of isopropyl palmitate, butoxy ethyl stearate, butyl stearate, iso-stearyl iso-stearate and isopropyl stearate.

7. A magnetic recording medium comprising: a backing, a magnetizable layer containing a magnetizable material on said backing; and a lubricant comprising an organic compound selected from the group consisting of isomers of alcohols having about 12 to 30 carbon atoms per molecule.

8. The magnetic recording medium of claim 2 wherein the magnetizable material is selected from the group consisting of: chromium oxide, ferric oxide, magnetite, cobalt doped ferric oxide, cobalt absorbed ferric oxide, cobalt doped magnetite, cobalt adsorbed magnetic, fine metal particles and the metal or metal alloy of a thin metal film medium.

9. The magnetic recording medium of claim 7 wherein the organic compound is present in an amount of less than or equal to five weight percent of the magnetizable material.

10. The magnetic recording medium of claim 7 in which the lubricant further comprises a fatty acid ester having about 12 to 40 carbon atoms in its molecules.

11. The magnetic recording medium of claim 10 in which the major carbon chain of the fatty acid ester has about the same number of carbon atoms as the organic compound.

12. The magnetic recording medium of claim 10 wherein the fatty acid ester is present in an amount of about five or less weight percent of the magnetizable material.

13. The magnetic recording medium of claim 7 wherein the organic compound is iso-stearyl alcohol.

* * * * *